US011417314B2

(12) United States Patent
Sun et al.

(10) Patent No.: US 11,417,314 B2
(45) Date of Patent: Aug. 16, 2022

(54) SPEECH SYNTHESIS METHOD, SPEECH SYNTHESIS DEVICE, AND ELECTRONIC APPARATUS

(71) Applicant: Baidu Online Network Technology (Beijing) Co., Ltd, Beijing (CN)

(72) Inventors: Chenxi Sun, Beijing (CN); Tao Sun, Beijing (CN); Xiaolin Zhu, Beijing (CN); Wenfu Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 320 days.

(21) Appl. No.: 16/797,267

(22) Filed: Feb. 21, 2020

(65) Prior Publication Data

US 2021/0090550 A1 Mar. 25, 2021

(30) Foreign Application Priority Data

Sep. 19, 2019 (CN) .......................... 201910888456.9

(51) Int. Cl.
*G10L 13/08* (2013.01)
*G10L 13/047* (2013.01)
(Continued)

(52) U.S. Cl.
CPC .............. *G10L 13/047* (2013.01); *G06N 3/08* (2013.01); *G10L 13/02* (2013.01); *G10L 13/08* (2013.01);
(Continued)

(58) Field of Classification Search
CPC ....... G10L 13/08; G10L 13/047; G10L 13/06; G10L 13/07; G10L 13/02; G10L 13/10; G06N 3/08; H04N 21/6437
(Continued)

(56) References Cited

U.S. PATENT DOCUMENTS 5,913,193 A * 6/1999 Huang .................... G10L 13/07
704/256.4
6,266,637 B1 * 7/2001 Donovan ................ G10L 13/06
704/258
(Continued)

FOREIGN PATENT DOCUMENTS

CN 105206264 A 12/2015
CN 105448289 A 3/2016
(Continued)

OTHER PUBLICATIONS

Wang, Tacotron: Towards End-to-End Speech Synthesis, 2017, Interspeech, Google, Inc, p. 1-8. (Year: 2017).*
(Continued)

*Primary Examiner* — Vijay B Chawan
(74) *Attorney, Agent, or Firm* — Akerman LLP

(57) ABSTRACT

A speech synthesis method, a speech synthesis device, and an electronic apparatus are provided, which relate to a field of speech synthesis. Specific implementation solution is the following: inputting text information into an encoder of an acoustic model, to output a text feature of a current time step; splicing the text feature of the current time step with a spectral feature of a previous time step to obtain a spliced feature of the current time step, and inputting the spliced feature of the current time step into an decoder of the acoustic model to obtain a spectral feature of the current time step; and inputting the spectral feature of the current time step into a neural network vocoder, to output speech.

12 Claims, 6 Drawing Sheets

(51) Int. Cl.
    *G06N 3/08*     (2006.01)
    *G10L 13/02*     (2013.01)
    *G10L 13/10*     (2013.01)
    *G10L 13/07*     (2013.01)
    *G10L 13/06*     (2013.01)

(52) U.S. Cl.
    CPC .............. *G10L 13/10* (2013.01); *G10L 13/06* (2013.01); *G10L 13/07* (2013.01)

(58) Field of Classification Search
    USPC ..................................... 704/238, 260, 256.4
    See application file for complete search history.

(56) References Cited

U.S. PATENT DOCUMENTS

| | | | |
|---|---|---|---|
| 6,915,261 | B2 | 7/2005 | Barile |
| 7,761,296 | B1* | 7/2010 | Bakis .................... G10L 13/02 704/238 |
| 10,210,860 | B1* | 2/2019 | Ward .................... G06N 3/084 |
| 10,726,830 | B1* | 7/2020 | Mandal ................ G06N 3/0454 |
| 11,080,591 | B2* | 8/2021 | van den Oord ....... G10L 13/086 |
| 11,205,417 | B2* | 12/2021 | Lee ........................ G10L 15/01 |
| 2002/0184373 | A1* | 12/2002 | Maes ................. H04N 21/6437 704/E15.047 |
| 2005/0071163 | A1* | 3/2005 | Aaron .................... G10L 13/10 704/260 |
| 2009/0006096 | A1* | 1/2009 | Li .......................... G10L 13/08 704/E13.011 |
| 2011/0046957 | A1 | 2/2011 | Hertz et al. |
| 2018/0247636 | A1* | 8/2018 | Arik ....................... G10L 25/30 |
| 2019/0180732 | A1* | 6/2019 | Ping ....................... G10L 13/00 |

FOREIGN PATENT DOCUMENTS

| | | |
|---|---|---|
| CN | 107545903 A | 1/2018 |
| CN | 107945786 A | 4/2018 |
| CN | 107992485 A | 5/2018 |
| CN | 109036377 A | 12/2018 |
| CN | 109326278 A | 2/2019 |
| CN | 109599092 A | 4/2019 |
| CN | 109697974 A | 4/2019 |
| CN | 109767755 A | 5/2019 |
| CN | 109841206 A | 6/2019 |
| CN | 109859736 A | 6/2019 |
| CN | 110164413 A | 8/2019 |
| CN | 110232907 A | 9/2019 |
| JP | 8-248990 A | 9/1996 |

OTHER PUBLICATIONS

First Office Action dated Jun. 22, 2020 issued in connection with corresponding Chinese Application No. 2019108884569.
Search Report dated Jun. 15, 2020 issued in connection with corresponding Chinese Application No. 2019108884569.
Zhang, "Study on Speech Synthesis Based on Deep Neural Network," Information Technology Series of Full-text Database of Excellent Master's Theses in China, Feb. 28, 2019.
Yin, "Research on Neural Network-based Acoustic Modeling for Speech Synthesis," Information Technology Series of China Doctoral Dissertation Full-Text Database, Sep. 30, 2016.
Shen et al., "Natural tts synthesis by conditioning wave net on mel spectrogram predictions," 2018 IEEE International Conference on Acoustics, Speech and Signal Processing (ICASSP), Sep. 13, 2018.

* cited by examiner auto-regressive mel-based recurrent neural network (MELRNN)

SPEECH SYNTHESIS METHOD, SPEECH SYNTHESIS DEVICE, AND ELECTRONIC APPARATUS

CROSS-REFERENCE TO RELATED APPLICATION

This application claims priority to Chinese Patent Application No. 201910888456.9, filed on Sep. 19, 2019, which is hereby incorporated by reference in its entirety.

TECHNICAL FIELD

The present application relates to a field of deep learning, and in particular, to a field of speech synthesis.

BACKGROUND

Speech synthesis is a technology that produces artificial speech through mechanical, electronic methods. That is, it is a technology that converts text information, generated by a computer itself or input from an external device, into understandable and fluent spoken Chinese. Particularly, the text is firstly converted into a compact audio representation, and then this representation is converted to an audio using an audio waveform synthesis method called a vocoder. For example, an existing smart apparatus needs to synthesize speech when playing it. However, when a sound is synthesized, an existing speech apparatus cannot synthesize a natural smooth sound, the synthesized sound has a poor quality, and the speech synthesis speed is slow.

SUMMARY

A speech synthesis method, a speech synthesis device, an electronic apparatus, and a storage medium are provided according to embodiments of the present application, to solve at least the above technical problems in the existing technology.

In a first aspect, a speech synthesis method is provided according to an embodiment of the application, which includes:

inputting text information into an encoder of an acoustic model, to output a text feature of a current time step;

splicing the text feature of the current time step with a spectral feature of a previous time step to obtain a spliced feature of the current time step, and inputting the spliced feature of the current time step into an decoder of the acoustic model to obtain a spectral feature of the current time step; and inputting the spectral feature of the current time step into a neural network vocoder, to output speech.

In this embodiment, the text feature of the current time step is spliced with a spectral feature of a previous time step to obtain a spliced feature of the current time step, and the spliced feature of the current time step is input into a decoder of the acoustic model to obtain a spectral feature of the current time step. By introducing auto-regression therein, the acoustic model can also produce high-reduction and high-naturalness speech in the case of a small amount of training data. The spectral feature of the current time step obtained after each auto-regression is input into a neural network vocoder to obtain synthesized speech. The neural network vocoder can realize a real-time and high-quality sound on a general apparatus, while reducing the amount of calculation and improving the synthesis speed. The auto-regressive acoustic model is combined with the neural network vocoder, which improves the naturalness and sound quality of synthesized speech while saving the hardware resource and enhancing the speech synthesis speed.

In an embodiment, the inputting text information into an encoder of an acoustic model, to output a text feature of a current time step includes:

passing the text information through at least one fully connected layer and a gated recurrent unit in the encoder, to output the text feature of the current time step.

In the embodiment, after the text information is passed through at least one fully connected layer and the gated recurrent unit, context information is effectively extracted, so that the expression of the synthesized speech is smoother.

In an embodiment, the splicing the text feature of the current time step with a spectral feature of a previous time step to obtain a spliced feature of the current time step, and inputting the spliced feature of the current time step into an decoder of the acoustic model to obtain a spectral feature of the current time step includes:

inputting the spliced feature of the previous time step into at least one gated recurrent unit and a fully connected layer in the decoder, to output a first spectral feature of the previous time step;

inputting the first spectral feature of the previous time step into another fully connected layer, to obtain a second spectral feature of the previous time step;

splicing the text feature of the current time step with the second spectral feature of the previous time step, to obtain the spliced feature of the current time step; and inputting the spliced feature of the current time step into the decoder of the acoustic model, to obtain a first spectral feature of the current time step.

In this embodiment, the first spectral feature of the previous time step or the second spectral feature of the previous time step may be spliced with the text feature of the current time step to obtain the spliced feature of the current time step, and the spliced feature of the current time step is input into the decoder of the acoustic model to obtain the first spectral feature of the current time step. The autoregressive spectral feature is formed in the decoder, and thus high-reduction and high-naturalness speech can also be produced in the case of a small amount of training data.

In an embodiment, the inputting the spectral feature of the current time step into a neural network vocoder, to output speech includes:

inputting the first spectral feature of the current time step into at least one convolutional neural network, to obtain a second spectral feature of the current time step; and inputting the first spectral feature of the current time step or the second spectral feature of the current time step into the neural network vocoder, to output the speech.

In this embodiment, the first spectral feature may be passed through two convolutional neural networks to obtain the second spectral feature, which enhances the smoothness of the first spectral feature. Through smoothness processing on the spectral feature by the convolutional neural network, the smoothness of the second spectral feature is higher than that of the first spectral feature.

In an embodiment, the speech synthesis method further includes:

calculating a first loss according to the first spectral feature of the current time step and a true spectral feature;

calculating a second loss according to the second spectral feature of the current time step and the true spectral feature; and training the acoustic model by taking the first loss and the second loss as starting points of a gradient back propagation.

In this embodiment, as the true spectral feature is introduced when calculating the first loss and the second loss, the spectral feature generated by the acoustic model trained by using the first loss and the second loss approximates to the true spectral feature, thereby improving a reduction degree of the synthetic speech.

In a second aspect, a speech synthesis device is provided according to an embodiment of the present application, which includes:

a text feature extracting module, configured to input text information into an encoder of an acoustic model, to output a text feature of a current time step;

a feature regression module, configured to splice the text feature of the current time step with a spectral feature of a previous time step to obtain a spliced feature of the current time step, and input the spliced feature of the current time step into an decoder of the acoustic model to obtain a spectral feature of the current time step; and a speech synthesis module, configured to input the spectral feature of the current time step into a neural network vocoder, to output speech.

In an embodiment, the text feature extracting module includes:

an encoding sub-module, configured to pass the text information through at least one fully connected layer and a gated recurrent unit in the encoder, to output the text feature of the current time step.

In an embodiment, the feature regression module includes:

a first decoding sub-module, configured to input the spliced feature of the previous time step into at least one gated recurrent unit and a fully connected layer in the decoder, to output a first spectral feature of the previous time step;

a regression sub-module, configured to input the first spectral feature of the previous time step into another fully connected layer, to obtain a second spectral feature of the previous time step;

a splicing sub-module, configured to splice the text feature of the current time step with the second spectral feature of the previous time step, to obtain the spliced feature of the current time step; and a second decoding sub-module, configured to input the spliced feature of the current time step into the decoder of the acoustic model, to obtain a first spectral feature of the current time step.

In an embodiment, the speech synthesis module includes:

a smoothing sub-module, configured to input the first spectral feature of the current time step into at least one convolutional neural network, to obtain a second spectral feature of the current time step; and a synthesis sub-module, configured to input the first spectral feature of the current time step or the second spectral feature of the current time step into the neural network vocoder, to output the speech.

In an embodiment, the speech synthesis device further includes:

a model training module, configured to calculate a first loss according to the first spectral feature of the current time step and a true spectral feature; calculate a second loss according to the second spectral feature of the current time step and the true spectral feature; and train the acoustic model by taking the first loss and the second loss as starting points of a gradient back propagation.

One of the above embodiments of the present application has the following advantages or beneficial effects: due to the use of an auto-regression technology in the acoustic model, it overcomes a technical problem that the synthesized sound cannot be naturally smooth, the sound quality is poor, and the speech synthesis speed is slow, thereby achieving the technical effects of improving the reduction and naturalness of the synthesized speech and enhancing the speech synthesis speed.

Other effects of the above alternatives will be described below in conjunction with specific embodiments.

BRIEF DESCRIPTION OF THE DRAWINGS

The drawings are used to better understand the embodiments, and do not constitute limitations to the present application, wherein.

DETAILED DESCRIPTION OF THE EMBODIMENTS

Exemplary embodiments of the present application are described below with reference to the accompanying drawings, which include various details of embodiments of the present application to facilitate understanding, and they should be considered as merely exemplary. Therefore, those skilled in the art should recognize that various changes and modifications can be made to the embodiments described herein without departing from the scope and spirit of the application. Also, for clarity and conciseness, descriptions of well-known functions and structures are omitted below.

Example 1

Figure 1:
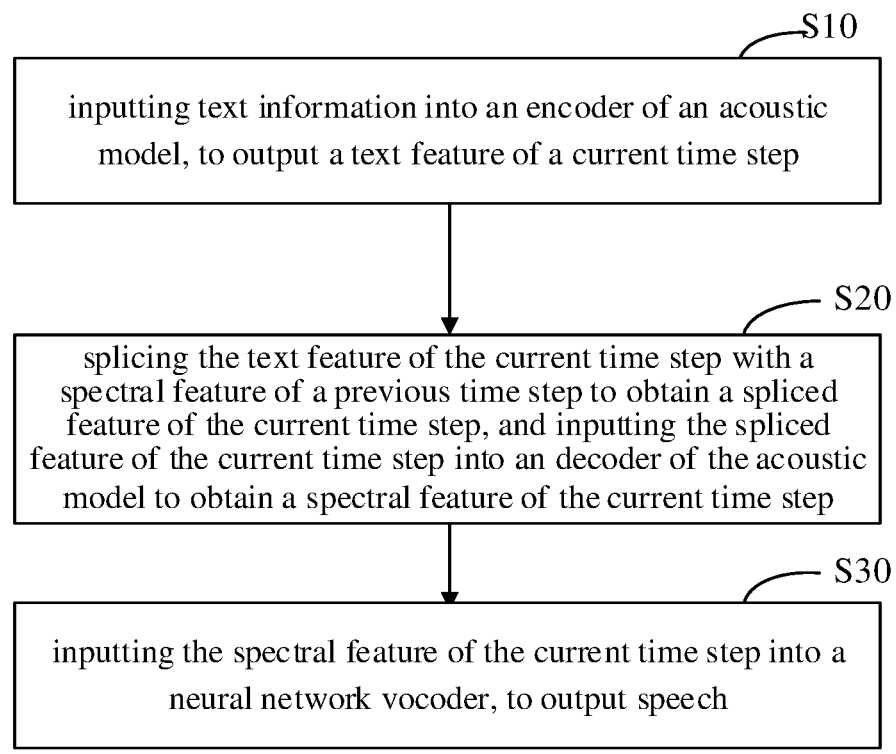
FIG. 1 is a schematic flowchart of a speech synthesis method according to an embodiment of the present application.

As shown in FIG. 1, a speech synthesis method is provided according to a specific embodiment. The speech synthesis method includes:

S10, inputting text information into an encoder of an acoustic model, to output a text feature of a current time step;

S20, splicing the text feature of the current time step with a spectral feature of a previous time step to obtain a spliced feature of the current time step, and inputting the spliced feature of the current time step into an decoder of the acoustic model to obtain a spectral feature of the current time step; and S30, inputting the spectral feature of the current time step into a neural network vocoder, to output speech.

In the embodiment, the acoustic model may be selected from an auto-regressive acoustic model, such as, an auto-regressive mel-based Recurrent Neural Network (MELRNN). A mel-based Linear Prediction Network (mel-LPCNet) may be selected as a neural network vocoder. Of course, another type of acoustic model or neural network vocoder may be selected adaptively according to actual requirement, which is within the protection scope of the embodiment. The auto-regressive acoustic model includes an encoder, a decoder, and a splicing module arranged between the encoder and the decoder. The encoder is configured to convert the text information into a high-dimensional text feature associated with a time sequence. The decoder is configured to convert the high-dimensional text feature into a spectral feature. The spectral feature itself has a characteristic of a time sequence. The text feature of the current time step output by the encoder and the spectral feature of the previous time step output by the decoder are spliced by the splicing module to obtain the spliced feature of the current time step. The spliced feature of the current time step is input into the decoder to obtain a spectral feature of the current time step. Recurring again and again, auto-regression is introduced into the acoustic model. A spectral feature of the last moment is introduced into a time derivation process of a recurrent neural network (RNN), so that the shortage of the recurrent neural network can be covered, and the recurrent neural network can also produce high-reduction and high-naturalness speech in the case of a small amount of training data.

Then, the spectral feature of the current time step obtained after each auto-regression is input into the mel-LPCNet, to obtain synthesized speech. The neural network vocoder may realize real-time and high-quality sound on a general apparatus, while reducing the amount of calculation and improving the synthesis speed. The auto-regressive acoustic model is combined with the neural network vocoder, which improves the naturalness and sound quality of synthesized speech while saving the hardware resource and enhancing the speech synthesis speed.

Figure 2:
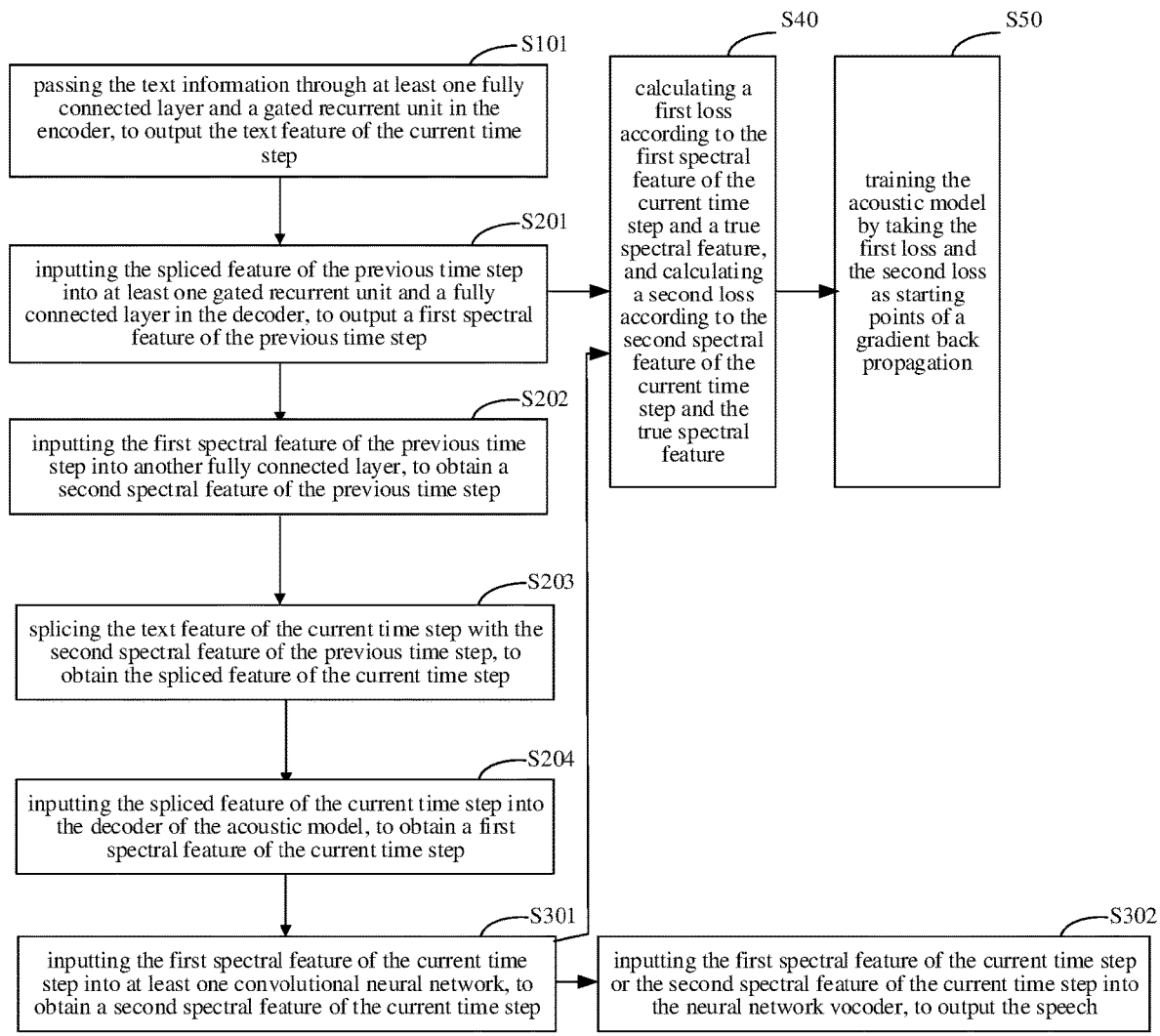
FIG. 2 is a schematic flowchart of another speech synthesis method according to an embodiment of the present application.

In an embodiment, as shown in FIG. 2, the S10 includes:

S101, passing the text information through at least one fully connected layer and a gated recurrent unit in the encoder, to output the text feature of the current time step.

In the embodiment, after the text information is passed through at least one fully connected layer and the gated recurrent unit, context information is effectively extracted, so that the expression of the synthesized speech is smoother.

In an embodiment, as shown in FIG. 2, the S20 includes:

S201, inputting the spliced feature of the previous time step into at least one gated recurrent unit and a fully connected layer in the decoder, to output a first spectral feature of the previous time step;

S202, inputting the first spectral feature of the previous time step into another fully connected layer, to obtain a second spectral feature of the previous time step;

S203, splicing the text feature of the current time step with the second spectral feature of the previous time step, to obtain the spliced feature of the current time step; and S204, inputting the spliced feature of the current time step into the decoder of the acoustic model, to obtain a first spectral feature of the current time step.

In this embodiment, the first spectral feature of the previous time step or the second spectral feature of the previous time step may be spliced with the text feature of the current time step to obtain the spliced feature of the current time step, and the spliced feature of the current time step is input into the decoder of the acoustic model to obtain the first spectral feature of the current time step. The auto-regressive spectral feature is formed in the decoder, and thus high-reduction and high-naturalness speech can also be produced in the case of a small amount of training data.

In an embodiment, as shown in FIG. 2, the S30 further includes:

S301, inputting the first spectral feature of the current time step into at least one convolutional neural network, to obtain a second spectral feature of the current time step; and S302, inputting the first spectral feature of the current time step or the second spectral feature of the current time step into the neural network vocoder, to output the speech.

In this embodiment, the first spectral feature may be passed through two convolutional neural networks to obtain the second spectral feature, which enhances the smoothness of the first spectral feature. Through smoothness processing on the spectral feature by the convolutional neural network, the smoothness of the second spectral feature is higher than that of the first spectral feature.

In an embodiment, as shown in FIG. 2, the method further includes:

S40, calculating a first loss according to the first spectral feature of the current time step and a true spectral feature, and calculating a second loss according to the second spectral feature of the current time step and the true spectral feature; and S50, training the acoustic model by taking the first loss and the second loss as starting points of a gradient back propagation.

In this embodiment, as the true spectral feature is introduced when calculating the first loss and the second loss, the spectral feature generated by the acoustic model trained by using the first loss and the second loss approximates to the true spectral feature, thereby improving a reduction degree of the synthetic speech.

Example 2

Figure 3:
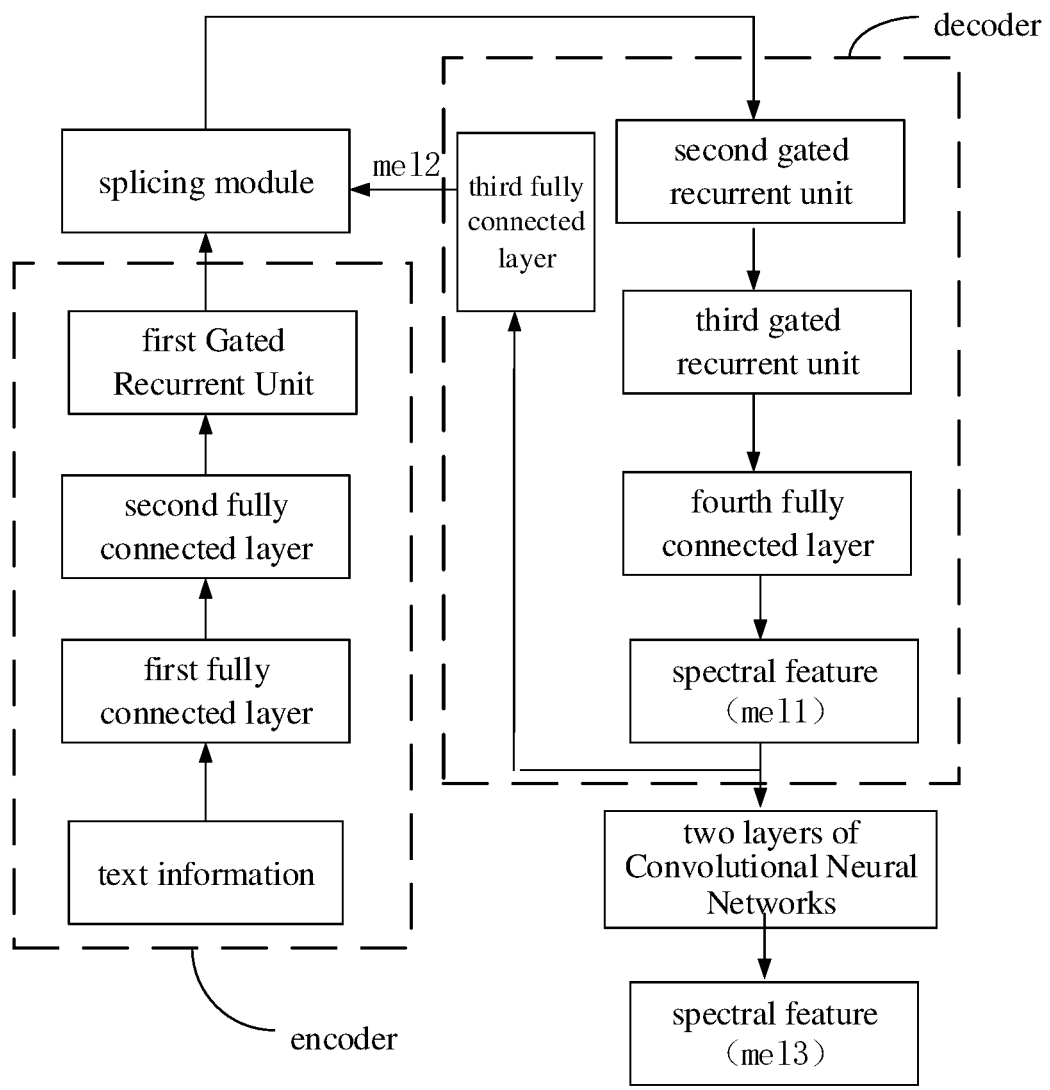
FIG. 3 is a scene diagram of a mel-based recurrent neural network that can implement embodiments of the present application.

In one example, speech synthesis includes two synthesis stages: in a first stage, a text is converted into rich-text information in a speech synthesis front-end system; and in a second stage, the rich-text information is synthesized into speech in a speech synthesis back-end system. An acoustic model for converting text information into a spectral feature can be provided in the speech synthesis back-end system. In this embodiment, firstly, an auto-regressive mel-based recurrent neural network (MELRNN) may be provided as the acoustic model, as shown in FIG. 3. The rich-text information given by the front-end system can be expanded into high-dimensional text information such as 615 dimensional text information by extracting five phonemes. The high-dimensional text information may be input into an encoder, and be passed through a first fully connected layer, a second fully connected layer, and a first Gated Recurrent Unit (GRU) to obtain a time-related high-dimensional text feature. The text feature of the current time step output by the encoder is spliced with a mel feature of the previous time step to obtain a spliced feature of the current time step. Through this step, the mel feature of the previous time step is introduced into a time progression process of MELRNN. The spliced feature of the current time step is input into a decoder, and is passed through a second gated recurrent unit, a third gated recurrent unit and a fourth fully connected layer. Then, the mel feature of the current time step is output, such as the spectral feature mel1 shown in FIG. 3. The result mel2 obtained after passing mel1 through a fully connected layer may be spliced with the text feature of a next time step to obtain the spliced feature of the next time step. Through this step, the mel feature of the current time step is introduced into the time progression process of the mel recurrent neural network. By that analogy, the mel features of multiple time steps are obtained. Mel1 is followed by two layers of Convolutional Neural Networks (CNNs) to obtain mel3, which makes the mel feature smoother.

Figure 4:
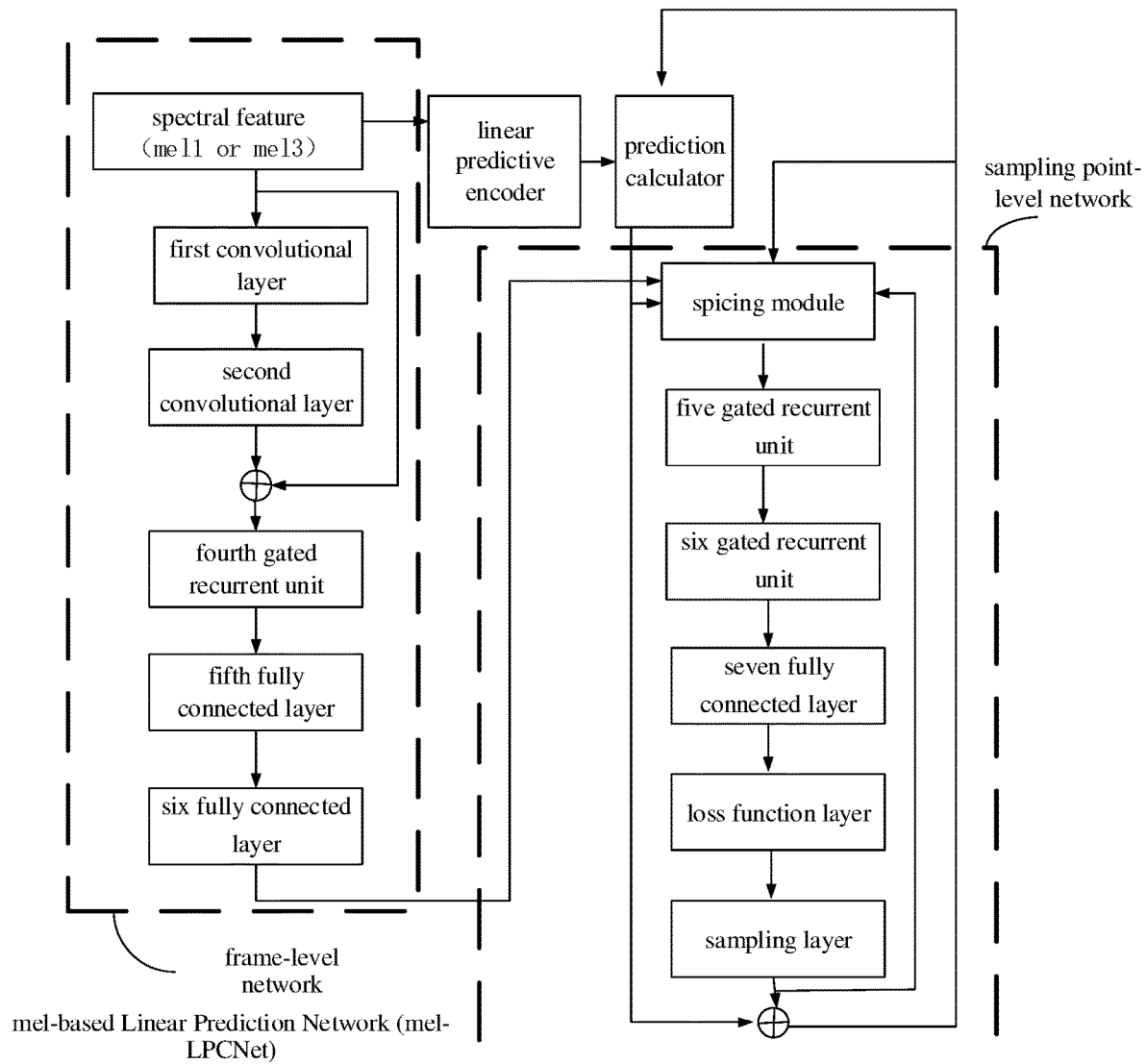
FIG. 4 is a scene diagram of a linear prediction neural network vocoder that can implement embodiments of the present application.

Then, a mel feature of each time step output by the auto-regressive mel-based acoustic model may be input into mel-LPCNet, for example, the mel1 or mel3 is input into the mel-LPCNet, which converts the mel feature into the speech. As shown in FIG. 4, the mel-LPCNet includes a frame-level network, a sampling point-level network, and a linear predictive encoder and a predictive calculator located between the two networks. The mel1 or mel3 is input into the mel-LPCNet, and the step of outputting the speech includes: inputting the mel1 or mel3 into the frame-level network, and extracting timing-related mel4. The melt or mel3 is input into the linear predictive encoder (computer LPC) and a weighted coefficient vector is output. The weighted coefficient vector and a linear sampling point output by a sampling point-level network are input into the prediction calculator for a linear operation to obtain a predicted sampling point. The predicted sampling point and mel4 are input into the sampling point-level network, and the linear sampling point included in the speech is output. The step of inputting the predicted sampling point and the mel4 into the sampling point-level network to output a linear sampling point includes: passing the predicted sampling point, the linear sampling point, a first compensation sampling point for deviation correction, and mel4 through a spicing module, at least one gated recurrent unit (such as a fifth gated recurrent unit and a sixth gated recurrent unit), a seventh fully connected layer, a loss function layer, and a sampling layer, to obtain a second compensation sampling point. The predicted sampling point is added to the second compensation sampling point to obtain a linear sampling point.

It should be noted that a real mel spectral feature can be extracted from an audio file. The real spectral feature is input into the mel-LPCNet, and the linear sampling point is obtained after calculation. The predicted spectral feature output by MELRNN may also be input into mel-LPCNet. The mel obtained by a method of using an output of a previous moment as an input of a next moment is used as an input feature for training the mel-LPCNet. The predicted spectral feature is used as a training sample to improve the accuracy of the trained acoustic model and the sound quality. In the case of taking the LPCNet as an independent vocoder, compared with other vocoders, LPCNet itself has a simple network structure. The mel-LPCNet transforms some of the learning tasks into mathematical operations with low computational cost through priori knowledge and a sparseness is used, so the cost-effective ratio is high. In addition, as the number of nodes of the proposed MELRNN and the mel-LPCNet is relatively small, a model size after quantization may be about 18 M and 2.3 M, respectively. The embodiment has characteristics of a small amount of calculation and low power consumption, and can also be used in embedded systems.

Example 3

Figure 5:
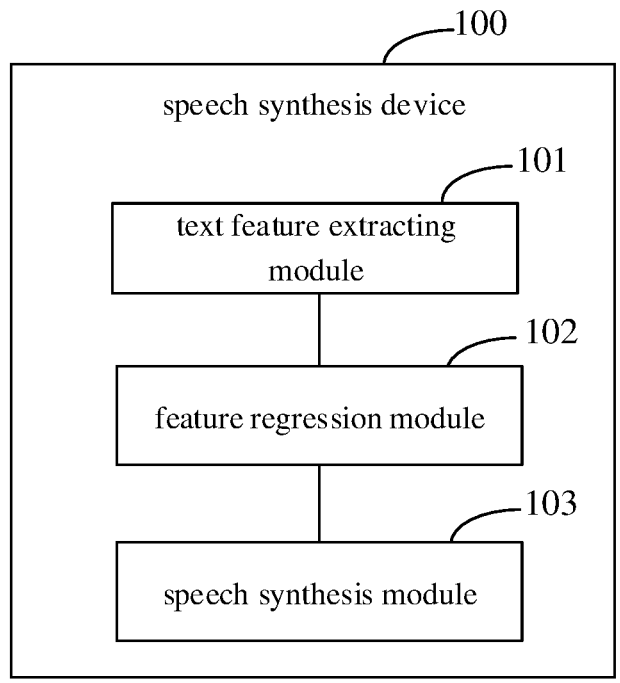
FIG. 5 is a structural block diagram of a speech synthesis device according to an embodiment of the present application.

As shown in FIG. 5, a speech synthesis device 100 is provided according to another specific embodiment. The speech synthesis device 100 includes:

a text feature extracting module 101, configured to input text information into an encoder of an acoustic model, to output a text feature of a current time step;

a feature regression module 102, configured to splice the text feature of the current time step with a spectral feature of a previous time step to obtain a spliced feature of the current time step, and input the spliced feature of the current time step into an decoder of the acoustic model to obtain a spectral feature of the current time step; and a speech synthesis module 103, configured to input the spectral feature of the current time step into a neural network vocoder, to output speech.

Figure 6:
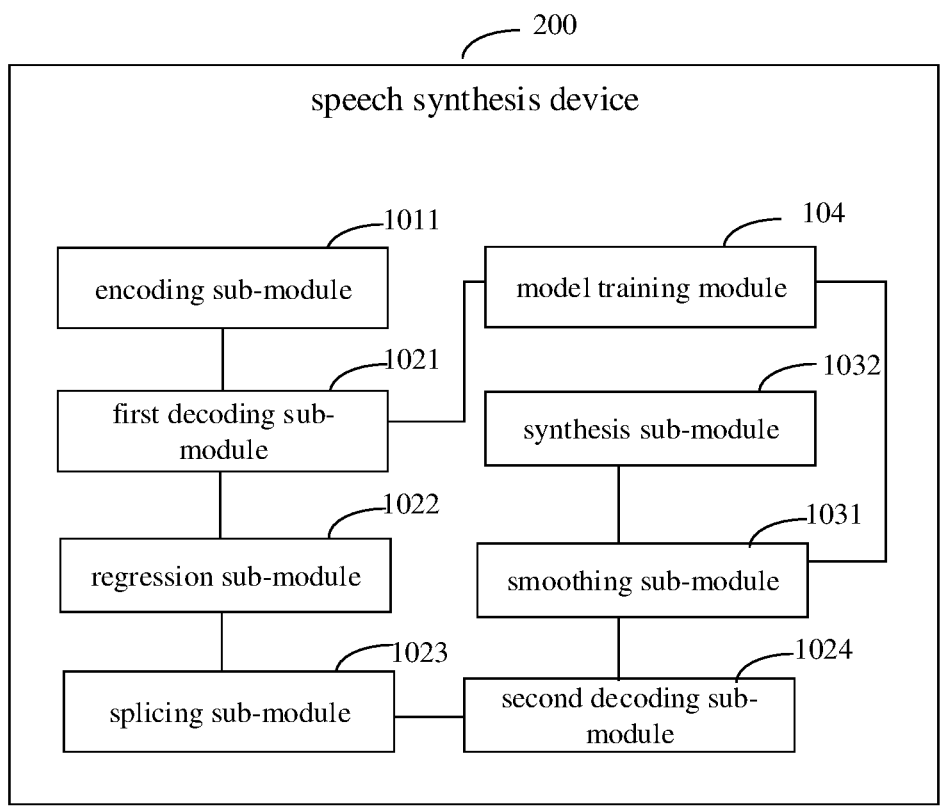
FIG. 6 is a structural block diagram of another speech synthesis apparatus according to an embodiment of the present application.

As shown in FIG. 6, a speech synthesis device 200 is provided according to an embodiment. The text feature extracting module 101 includes:

an encoding sub-module 1011, configured to pass the text information through at least one fully connected layer and a gated recurrent unit in the encoder, to output the text feature of the current time step.

In an embodiment, as shown in FIG. 6, the feature regression module 102 includes:

a first decoding sub-module 1021, configured to input the spliced feature of the previous time step into at least one gated recurrent unit and a fully connected layer in the decoder, to output a first spectral feature of the previous time step;

a regression sub-module 1022, configured to input the first spectral feature of the previous time step into another fully connected layer, to obtain a second spectral feature of the previous time step;

a splicing sub-module 1023, configured to splice the text feature of the current time step with the second spectral feature of the previous time step, to obtain the spliced feature of the current time step; and a second decoding sub-module 1024, configured to input the spliced feature of the current time step into the decoder of the acoustic model, to obtain a first spectral feature of the current time step.

In an embodiment, as shown in FIG. 6, the speech synthesis module 103 includes:

a smoothing sub-module 1031, configured to input the first spectral feature of the current time step into at least one convolutional neural network, to obtain a second spectral feature of the current time step; and a synthesis sub-module 1032, configured to input the first spectral feature of the current time step or the second spectral feature of the current time step into the neural network vocoder, to output the speech.

In an embodiment, as shown in FIG. 6, the speech synthesis device further includes:

a model training module 104, configured to calculate a first loss according to the first spectral feature of the current time step and a true spectral feature; calculate a second loss according to the second spectral feature of the current time step and the true spectral feature; and train the acoustic model by taking the first loss and the second loss as starting points of a gradient back propagation.

An electronic apparatus and a readable storage medium are provided according to embodiments of the present application.

Figure 7:
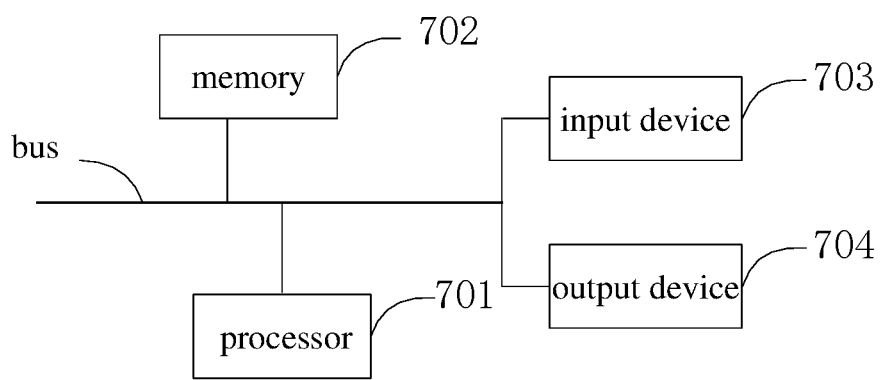
FIG. 7 is a block diagram of an electronic apparatus for implementing a speech synthesis method according to an embodiment of the present application.

FIG. 7 shows a block diagram of an electronic apparatus for an speech synthesis method according to an embodiment of the present application. The electronic apparatus are intended to represent various forms of digital computers, such as laptop computers, desktop computers, workbenches, personal digital assistants, servers, blade servers, mainframe computers, and other suitable computers. Electronic apparatus may also represent various forms of mobile devices, such as personal digital assistants, cellular phones, intelligent phones, wearable devices, and other similar computing devices. The components shown here, their connections and relationships, and their functions are merely examples, and are not intended to limit the implementation of the application described and/or required herein.

As shown in FIG. 7, the electronic apparatus includes: one or more processors 701, a memory 702, and interfaces for connecting various components, which include a high-speed interface and a low-speed interface. The various components are interconnected using different buses and can be mounted on a common motherboard or otherwise installed as required. The processor may process instructions executed within the electronic apparatus, which include instructions stored in or on a memory to display graphic information of a graphical user interface (GUI) on an external input/output device (such as a display device coupled to the interface). In other embodiments, multiple processors and/or multiple buses can be used with multiple memories, if desired. Similarly, multiple electronic apparatus can be connected, each providing some of the necessary operations (for example, as a server array, a group of blade servers, or a multiprocessor system). A processor 701 is taken as an example in FIG. 7.

The memory 702 is a non-transitory computer-readable storage medium according to an embodiment of the present application. The memory stores instructions executable by at least one processor, so that the at least one processor executes the speech synthesis method according to the embodiments of the present application. The non-transitory computer-readable storage medium of the present application stores computer instructions, which are used to cause a computer to execute the speech synthesis method according to the embodiments of the present application.

As a non-transitory computer-readable storage medium, the memory 702 may be used to store non-transitory software programs, non-transitory computer executable programs, and modules, such as program instructions/modules/units corresponding to the speech synthesis method according to the embodiments of the present application (for example, the text feature extracting module 101, the feature regression module 102, and the speech synthesis module 103 shown in FIG. 5). The processor 701 executes various functional applications and data processing of the server by running non-transitory software programs, instructions, and modules stored in the memory 702, that is, the speech synthesis method according to the embodiments of the present application can be implemented.

The memory 702 may include a storage program area and a storage data area, where the storage program area may store an operating system and an application program required for at least one function; and the storage data area may store data created according to the use of the electronic apparatus for the speech synthesis method, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include a memory remotely set relative to the processor 701, and these remote memories may be connected to the electronic apparatus for the speech synthesis method via a network. Examples of the above network include, but are not limited to, the Internet, an intranet, a local area network, a mobile communication network, and combinations thereof.

The electronic apparatus for the speech synthesis method may further include an input device 703 and an output device 704. The processor 701, the memory 702, the input device 703, and the output device 704 may be connected through a bus or in other manners. In FIG. 7, the connection through the bus is taken as an example.

The input device 703 can receive inputted numeric or character information, and generate key signal inputs related to user settings and function control of an electronic apparatus for the speech synthesis method, such as a touch screen, a keypad, a mouse, a trackpad, a touchpad, a pointing stick, one or more mouse buttons, a trackball, a joystick and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein can be implemented in digital electronic circuit systems, integrated circuit systems, application specific integrated circuits (ASICs), computer hardwares, firmwares, softwares, and/or combinations thereof. These various embodiments may include: implementation in one or more computer programs executable on and/or interpretable on a programmable system including at least one programmable processor, which may be a dedicated or general-purpose programmable processor that can receive data and instructions from a storage system, at least one input device, and at least one output device, and transmit data and instructions to the storage system, the at least one input device, and the at least one output device.

These computing programs (also known as programs, software, software applications, or codes) include machine instructions of a programmable processor and may be implemented using high-level procedures and/or object-oriented programming languages, and/or assembly/machine languages. As used herein, the terms "machine-readable medium" and "computer-readable medium" refer to any computer program product, device, and/or device used to provide machine instructions and/or data to a programmable processor (for example, magnetic disks, optical disks, memories, and programmable logic devices (PLDs)), include machine-readable media that receives machine instructions as machine-readable signals. The term "machine-readable signal" refers to any signal used to provide machine instructions and/or data to a programmable processor.

In order to provide interaction with the user, the systems and techniques described herein may be implemented on a computer having a display device (for example, a Cathode Ray Tube (CRT) or Liquid Crystal Display (LCD) monitor) for displaying information to the user; and a keyboard and pointing device (such as a mouse or trackball) through which the user can provide input into a computer. Other kinds of devices may also be used to provide interaction with the user. For example, the feedback provided to the user may be any form of sensory feedback (for example, visual feedback, auditory feedback, or haptic feedback); and may be in any form (including acoustic input, voice input, or tactile input) to receive input from the user.

The systems and technologies described herein can be implemented in a computing system including background components (for example, as a data server), a computing system including middleware components (for example, an application server), or a computing system including front-end components (for example, a user computer with a graphical user interface or a web browser, through which the user can interact with the implementation of the systems and technologies described herein), or a computer system including any combination of such background components, middleware components, and front-end components. The components of the system may be interconnected by any form or medium of digital data communication (such as, a communication network). Examples of communication networks include: a local area network (LAN), a wide area network (WAN), and the Internet.

The computer system may include clients and servers. The client and server are generally remote from each other and typically interact through a communication network. The client-server relationship is generated by computer programs running on the respective computers and having a client-server relationship with each other.

According to the technical solutions of the embodiments of the present application, auto-regression is introduced into the acoustic model, and the spectral feature of the previous moment are explicitly introduced into the time derivation process of the acoustic model, so that the acoustic model can also produce high-reduction and high-naturalness speech in the case of a small amount of training data, while enhancing the speech synthesis speed. The spectral feature of each time step, such as the obtained spectral feature of the previous time step or the spectral feature of the current time step, is input into the neural network vocoder to obtain the synthesized speech. The neural network vocoder can realize real-time and high-quality sound on a general apparatus. The auto-regressive acoustic model is combined with the neural network vocoder, which improves the naturalness and sound quality of synthesized speech while saving the hardware resource and enhancing the speech synthesis speed.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein.

The foregoing specific embodiment above do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A speech synthesis method, comprising:
   inputting text information into an encoder of an acoustic model, to output a text feature of a current time step;
   splicing the text feature of the current time step with a spectral feature of a previous time step to obtain a spliced feature of the current time step, and inputting the spliced feature of the current time step into a decoder of the acoustic model to obtain a spectral feature of the current time step; and
   inputting the spectral feature of the current time step into a neural network vocoder, to output speech;
   wherein the splicing the text feature of the current time step with a spectral feature of a previous time step to obtain a spliced feature of the current time step, and inputting the spliced feature of the current time step into a decoder of the acoustic model to obtain a spectral feature of the current time step comprises:
   inputting the spliced feature of the previous time step into at least one gated recurrent unit and a fully connected layer in the decoder, to output a first spectral feature of the previous time step;
   inputting the first spectral feature of the previous time step into another fully connected layer, to obtain a second spectral feature of the previous time step;
   splicing the text feature of the current time step with the second spectral feature of the previous time step, to obtain the spliced feature of the current time step; and
   inputting the spliced feature of the current time step into the decoder of the acoustic model, to obtain a first spectral feature of the current time step.

2. The speech synthesis method according to claim 1, wherein the inputting text information into an encoder of an acoustic model, to output a text feature of a current time step comprises:
   passing the text information through at least one fully connected layer and a gated recurrent unit in the encoder, to output the text feature of the current time step.

3. The speech synthesis method according to claim 1, wherein the inputting the spectral feature of the current time step into a neural network vocoder, to output speech comprises:
   inputting the first spectral feature of the current time step into at least one convolutional neural network, to obtain a second spectral feature of the current time step; and
   inputting the first spectral feature of the current time step or the second spectral feature of the current time step into the neural network vocoder, to output the speech.

4. The speech synthesis method according to claim 3, further comprising:
   calculating a first loss according to the first spectral feature of the current time step and a true spectral feature;
   calculating a second loss according to the second spectral feature of the current time step and the true spectral feature; and
   training the acoustic model by taking the first loss and the second loss as starting points of a gradient back propagation.

5. A speech synthesis device, comprising:
   one or more processors; and
   a storage device configured to store one or more programs, wherein
   the one or more programs, when executed by the one or more processors, cause the one or more processors to:
   input text information into an encoder of an acoustic model, to output a text feature of a current time step;
   splice the text feature of the current time step with a spectral feature of a previous time step to obtain a spliced feature of the current time step, and input the spliced feature of the current time step into a decoder of the acoustic model to obtain a spectral feature of the current time step; and
   input the spectral feature of the current time step into a neural network vocoder, to output speech;
   wherein the one or more programs, when executed by the one or more processors, cause the one or more processors further to:
   input the spliced feature of the previous time step into at least one gated recurrent unit and a fully connected layer in the decoder, to output a first spectral feature of the previous time step;

input the first spectral feature of the previous time step into another fully connected layer, to obtain a second spectral feature of the previous time step;

splice the text feature of the current time step with the second spectral feature of the previous time step, to obtain the spliced feature of the current time step; and input the spliced feature of the current time step into the decoder of the acoustic model, to obtain a first spectral feature of the current time step.

6. The speech synthesis device according to claim 5, wherein the one or more programs, when executed by the one or more processors, cause the one or more processors further to:

pass the text information through at least one fully connected layer and a gated recurrent unit in the encoder, to output the text feature of the current time step.

7. The speech synthesis device according to claim 5, wherein the one or more programs, when executed by the one or more processors, cause the one or more processors further to:

input the first spectral feature of the current time step into at least one convolutional neural network, to obtain a second spectral feature of the current time step; and input the first spectral feature of the current time step or the second spectral feature of the current time step into the neural network vocoder, to output the speech.

8. The speech synthesis device according to claim 7, wherein the one or more programs, when executed by the one or more processors, cause the one or more processors further to:

calculate a first loss according to the first spectral feature of the current time step and a true spectral feature; calculate a second loss according to the second spectral feature of the current time step and the true spectral feature; and train the acoustic model by taking the first loss and the second loss as starting points of a gradient back propagation.

9. A non-transitory computer-readable storage medium comprising computer executable instructions stored thereon, wherein the executable instructions, when executed by a computer, causes the computer to:

input text information into an encoder of an acoustic model, to output a text feature of a current time step;

splice the text feature of the current time step with a spectral feature of a previous time step to obtain a spliced feature of the current time step, and input the spliced feature of the current time step into a decoder of the acoustic model to obtain a spectral feature of the current time step; and input the spectral feature of the current time step into a neural network vocoder, to output speech;

wherein the executable instructions, when executed by the computer, causes the computer further to:

input the spliced feature of the previous time step into at least one gated recurrent unit and a fully connected layer in the decoder, to output a first spectral feature of the previous time step;

input the first spectral feature of the previous time step into another fully connected layer, to obtain a second spectral feature of the previous time step;

splice the text feature of the current time step with the second spectral feature of the previous time step, to obtain the spliced feature of the current time step; and input the spliced feature of the current time step into the decoder of the acoustic model, to obtain a first spectral feature of the current time step.

10. The non-transitory computer-readable storage medium according to claim 9, wherein the executable instructions, when executed by the computer, causes the computer further to:

pass the text information through at least one fully connected layer and a gated recurrent unit in the encoder, to output the text feature of the current time step.

11. The non-transitory computer-readable storage medium according to claim 9, wherein the executable instructions, when executed by the computer, causes the computer further to:

input the first spectral feature of the current time step into at least one convolutional neural network, to obtain a second spectral feature of the current time step; and input the first spectral feature of the current time step or the second spectral feature of the current time step into the neural network vocoder, to output the speech.

12. The non-transitory computer-readable storage medium according to claim 11, wherein the executable instructions, when executed by the computer, causes the computer further to:

calculate a first loss according to the first spectral feature of the current time step and a true spectral feature;

calculate a second loss according to the second spectral feature of the current time step and the true spectral feature; and train the acoustic model by taking the first loss and the second loss as starting points of a gradient back propagation.

* * * * *